United States Patent
Quirk et al.

(10) Patent No.: US 7,496,496 B2
(45) Date of Patent: *Feb. 24, 2009

(54) SYSTEM AND METHOD FOR MACHINE LEARNING A CONFIDENCE METRIC FOR MACHINE TRANSLATION

(75) Inventors: Christopher B. Quirk, Seattle, WA (US); Arul A. Menezes, Bellevue, WA (US); Stephen D. Richardson, Redmond, WA (US); Robert C. Moore, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/725,435

(22) Filed: Mar. 19, 2007

(65) Prior Publication Data

US 2007/0219774 A1    Sep. 20, 2007

Related U.S. Application Data

(62) Division of application No. 10/309,950, filed on Dec. 4, 2002, now Pat. No. 7,209,875.

(51) Int. Cl.
*G06F 17/28*    (2006.01)
*G06F 17/20*    (2006.01)
*G10L 11/00*    (2006.01)

(52) U.S. Cl. .................... 704/2; 704/8; 704/277
(58) Field of Classification Search .......... None
See application file for complete search history.

(56) References Cited

U.S. PATENT DOCUMENTS

| 5,477,451 | A  | 12/1995 | Brown et al. | 704/9 |
| 6,285,978 | B1 | 9/2001  | Bernth et al. | 704/7 |
| 6,393,389 | B1 | 5/2002  | Chanod et al. | 704/7 |
| 6,996,518 | B2 | 2/2006  | Jones et al. | 704/8 |
| 7,050,964 | B2 | 5/2006  | Menzes et al. | 704/2 |

OTHER PUBLICATIONS

Aikawa, T., et al., "Multilingual Natural Generation," Proceedings of 8th European Workshop on Natural Language Generation, ACL 2001.
Brown, R., "Adding Linguistic Knowledge to a Lexical Example-based translation System," Proceedings of TMI99, (1999).
Franz A., et al., "An Integrated Architecture for Example-based Machine Translation," Proceedings of COLING2000, (2000).

(Continued)

*Primary Examiner*—David R Hudspeth
*Assistant Examiner*—Brian L Albertalli
(74) *Attorney, Agent, or Firm*—Westman, Champlin & Kelly, P.A.

(57) ABSTRACT

A machine translation system is trained to generate confidence scores indicative of a quality of a translation result. A source string is translated with a machine translator to generate a target string. Features indicative of translation operations performed are extracted from the machine translator. A trusted entity-assigned translation score is obtained and is indicative of a trusted entity-assigned translation quality of the translated string. A relationship between a subset of the extracted features and the trusted entity-assigned translation score is identified.

12 Claims, 6 Drawing Sheets

OTHER PUBLICATIONS

Frederking, R., et al. "Integrating Translations from Multiple Sources Within the Pangloss Mark III Machine Translation System," Proceedings of AMTA94, (1994).

Heidorn, G., et al., "Intelligent Writing Assistance," in R. Dale, H. Moisl and, (2000).

Meyers, A., et al., "Chart-based Transfer Rule Applications in Machine Translation," Proceedings of COLING-ACL98, (1998).

Menezes, A., et al., "A Best-First Alignment Algorithm for Automatic Extraction of Transfer Mappings From Bilingual Corpora," Proceedings of the Workshop on Data-Driven Machine Translation, ACL 2001.

Moore, R., "Towards a Simple and Accurate Statistical Approach to Learning Translation Relationships Among Words," Proceedings of the Workshop on Data-Driven Machine Translation, ACL 2001.

Pinkham, J., et al., "Adding Domain Specificity to an MT System," Proceedings of the Workshop on Data-Driven Machine Translation, ACL 2001.

Richardson, S., et al., "MindNet: Acquiring and Structuring Semantic Information from Text," Proceedings of COLING-ACL98, (1998).

Richardson, S., et al., "Overcoming the Customization Bottleneck Using Example-Based MT", ACL 2001.

Takeda, K., et al., "Shalt 2-A Symmetric Machine Translation System with Conceptual Transfer," Proceedings of COLING92, (1992).

Turcato, D., et al., "A Unified Example-Based and Lexicalist Approach to Machine Translation," Proceedings of TNI99, (1999).

Walker et al., "Evaluating Spoken Dialog Agents with Paradise: Two Case Studies". pp. 1-31 (1998).

Watanabe, W., et al., "Finding Structural Correspondences from Bilingual Parsed Corpus-based Translation," Proceedings of COLING2000, (2000).

Watanabe, H., et al., "A Pattern-based Machine Translation System Extended by Example-based Processing," Proceedings of COLING-ACL98, (1998).

Bernth et al., "The Effect of Source Analysis on Translation Confidence", Lecture Notes In Computer Science, vol. 1934, Proceedings of the 4th Conference of the Association for Machine Translation in the Americas on Envisioning Machine Translation in the Information Future, pp. 89-99, 2000.

Kussner et al., "Combining Different Translation Sources", Natural Language Processing -NLP 2000: Second International Conference, Patras, Greece, Jun. 2000, Proceedings pp. 261-271.

Oz, et al., "Ordering Translation Templates by Assigning Confidence Factors", Lecture Notes in Computer Science 1529, Springer Verlag, 1998, pp. 51-61.

FEATURES

|  | F1 | F2 | F3 | F4 | ... | FM | EVALUATION OUTPUT |
|---|---|---|---|---|---|---|---|
| SENTENCE 1 |  |  |  |  |  |  |  |
| SENTENCE 2 |  |  |  |  |  |  |  |
| ⋮ | ⋮ |  |  |  | ... |  |  |
| SENTENCE N |  |  |  |  |  |  |  |

FIG. 4

SOURCE OF TRANSLATION

|  | MINDNET | DICTIONARY | UNTRANSLATED WORD | TOTALS |
|---|---|---|---|---|
| CONTENT WORDS |  |  |  |  |
| PREPOSITIONS |  |  |  |  |
| COORDINATIONS |  |  |  |  |
| FACTOIDS/CAPTIODS |  |  |  |  |
| TOTALS |  |  |  |  |

FIG. 6

SYSTEM AND METHOD FOR MACHINE LEARNING A CONFIDENCE METRIC FOR MACHINE TRANSLATION

The present application is a divisional of and claims priority of U.S. patent application Ser. No. 10/309,950, filed Dec. 4, 2002, the content of which is hereby incorporated by reference in its entirety.

BACKGROUND OF THE INVENTION

The present invention relates to machine translation. More specifically, the present invention relates to machine learning a confidence metric associated with machine translation results.

Machine translation refers to the process of receiving an input string in a source language and automatically generating an output string in a target language. The output string will desirably be an accurate and fluent translation of the input string from the source language to the target language.

When translating a set of sentences using a machine translation system, the quality of the translations output by the machine translation system typically varies widely. Some sentences are translated accurately and fluently, others are translated adequately, but not necessarily accurately or fluently, and some (hopefully a small set) are translated into a translation result which is simply incomprehensible.

One primary application of a machine translation system is to aid human translators. In other words, as a human translator translates a document, a component of helper software which is sometimes referred to as a translator's workbench attempts to minimize the human effort involved by consulting a database of past translations and suggesting translations that match the input string within a certain threshold. In order to perform properly, the translator's workbench must somehow decide which of the translation hypotheses is most useful to a human translator. It has been found that if the translator's workbench chooses the wrong translation hypotheses to display to the user, this may actually waste more time than it saves because it confuses or misleads the human translator.

In prior systems, each individual rule used in the machine translation process was given a hand-coded score. The score was indicative of how well each rule worked in the machine translation process. However, the individual scoring was performed by doing a slow, hand-coded pass through an entire machine translation system which is extremely expensive and subject to errors, in addition to being difficult to customize to different domains.

SUMMARY OF THE INVENTION

One aspect of the invention is implemented as two major phases: training a machine translation system to produce confidence scores, and applying that process to produce a confidence metric during translation.

In the first phase, a machine translation system is trained to generate confidence scores indicative of a quality of a translation result. A source string is translated with a machine translator to generate a target string. Features indicative of translation steps performed to obtain the target string are extracted from the machine translator. A trusted entity-assigned translation score is obtained and is indicative of a trusted entity-assigned translation quality of the target string. A correlation between a subset of the features and the trusted entity-assigned score is identified.

In one embodiment, a correlation coefficient is calculated. A correlation coefficient is associated with each of the extracted features in the identified subset. The correlation coefficient is indicative of a correlation between the extracted feature and the trusted entity-assigned score.

In the second phase, a translation result is generated that is indicative of a source string translated into a target string. The target string is output along with a confidence metric that is indicative of an estimated trusted translation quality score.

In one embodiment, the confidence metric is calculated based on a set of features that is indicative of translation quality. The confidence metric can be calculated using pre-calculated correlation coefficients indicative of a correlation between each of the extracted features and the trusted translation quality.

BRIEF DESCRIPTION OF THE DRAWINGS

FIG. 4 illustrates an extracted feature metric in accordance with one embodiment of the present invention.

FIG. 6 illustrates a number of different extracted features in accordance with one embodiment of the present invention.

DETAILED DESCRIPTION OF ILLUSTRATIVE EMBODIMENTS

The present invention relates to generating a confidence metric in a machine translation system. The confidence metric is indicative of the quality of the translated output. However, prior to discussing the present invention in detail, a general description of the one illustrative environment in which the present invention can be practiced will be undertaken.

Figure 1:
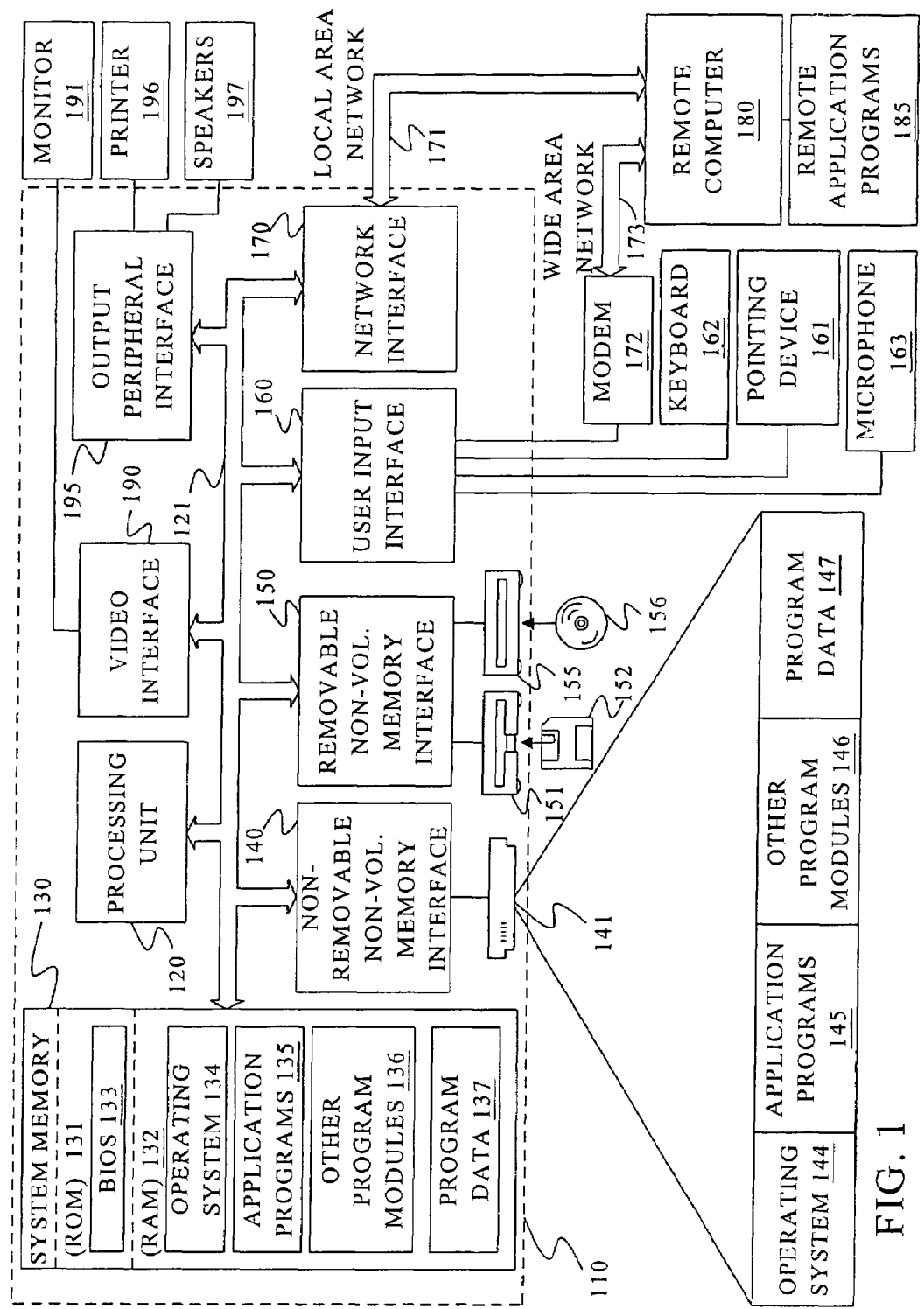
FIG. 1 is a block diagram of an illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
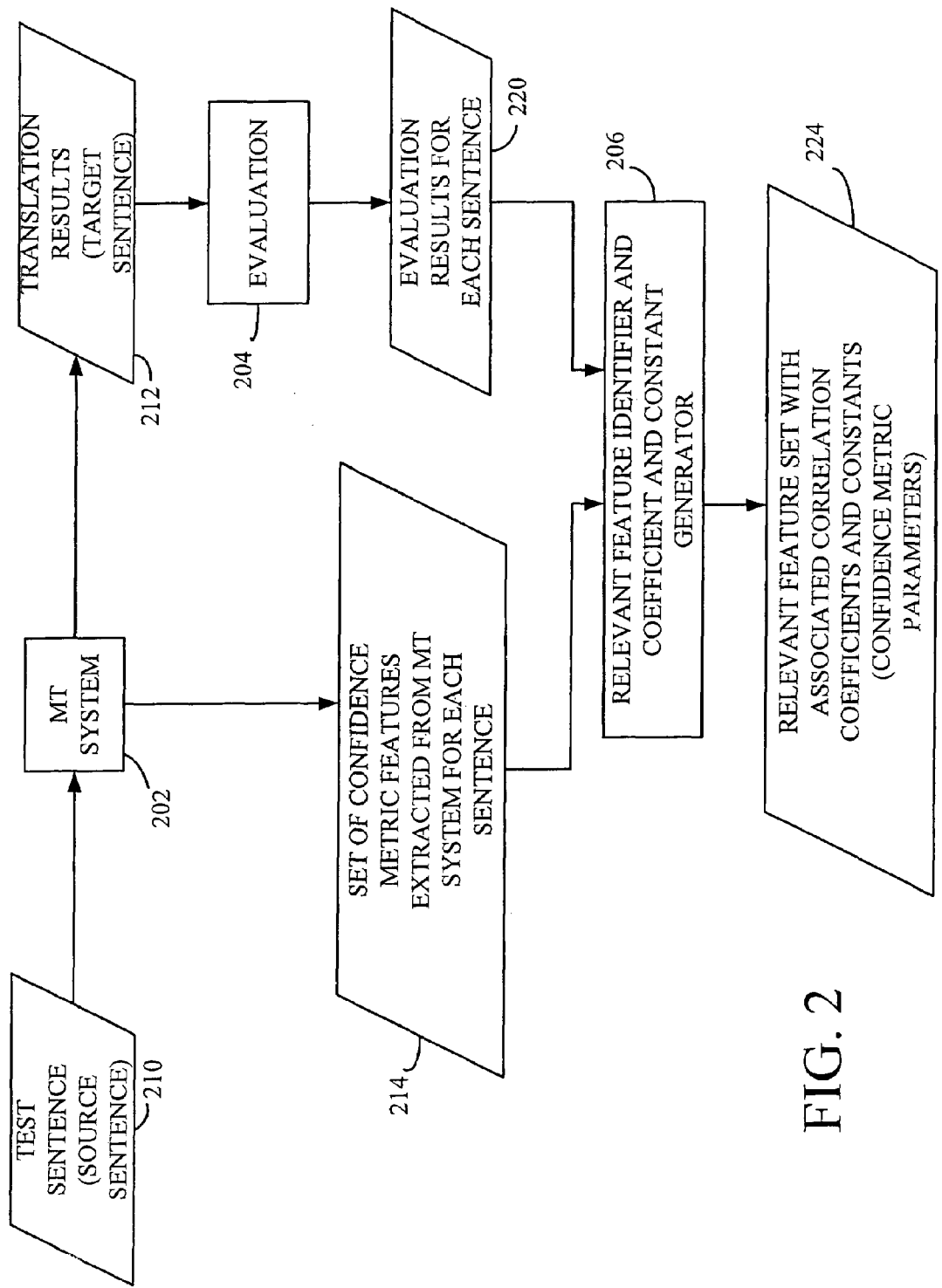
FIG. 2 is a more detailed block diagram of one embodiment of a system in accordance with the present invention.

FIG. 2 is a block diagram of a confidence metric training system that trains a machine translation system to generate a confidence metric associated with a translation output wherein the confidence metric is indicative of the quality of the translation output. System 200 includes machine translator (or machine translation system) 202, evaluation component 204, and relevant feature identifier and coefficient and constant generator (generator) 206.

Machine translation system 202 can be any conventional machine translation system, but it is instrumented to produce a number of statistics, or features, that describe the translation process. One embodiment of machine translation system 202 is described in greater detail in Richardson et al., *Overcoming the Customization Bottleneck Using Example-Based MT*, ACL, COLING—2001. Evaluation component 204 is illustratively simply a component which allows human linguists (or another trusted entity) to evaluate and assign a score to the translation results output by machine translation system 202. Generator 206 can be any type of generator that identifies a correlation between the features extracted from the machine translation system 202 during the machine translation process and the evaluation scores generated at evaluation component 204.

Figure 3:
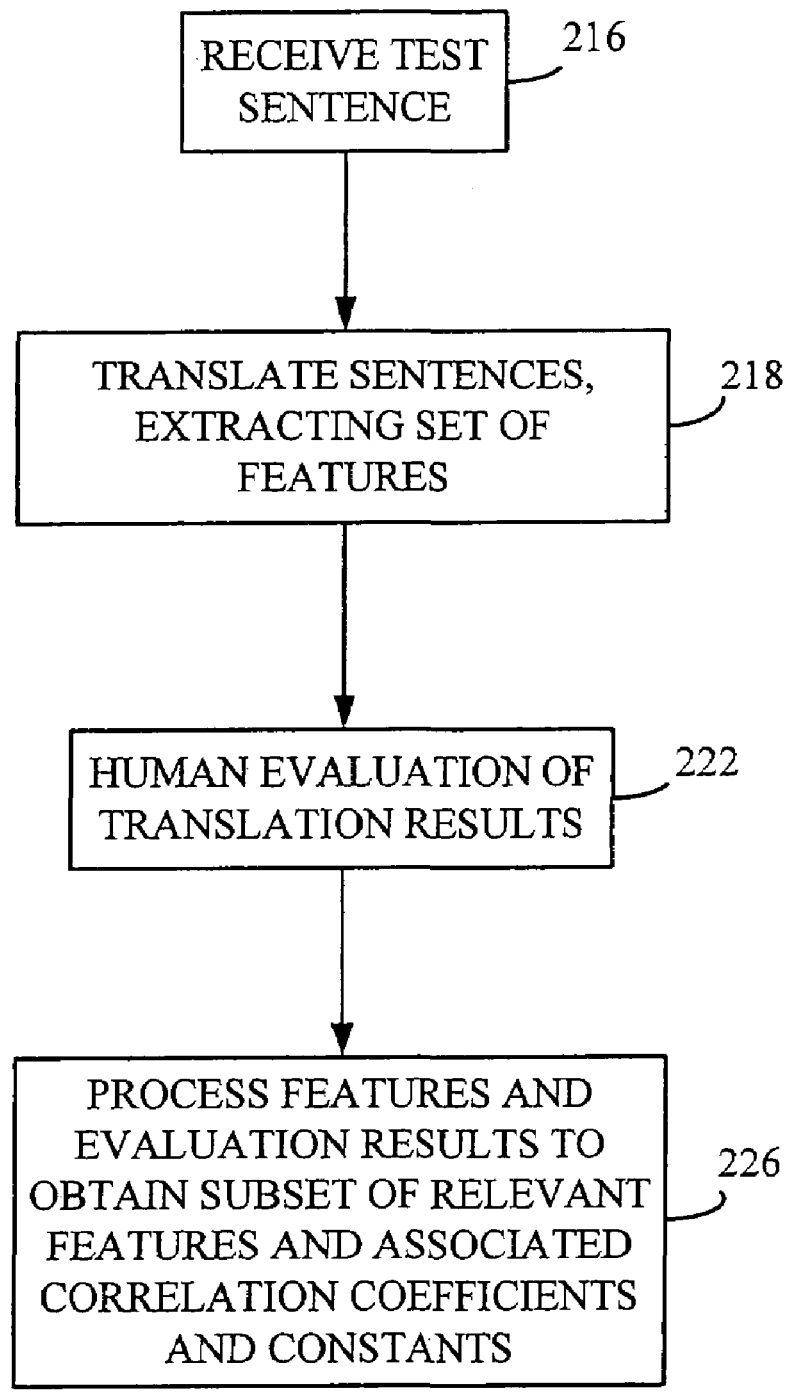
FIG. 3 is a flow diagram illustrating the operation of the system shown in FIG. 2.

FIG. 3 is a flow diagram indicating the general operation of system 200. The operation of system 200 will now be described with respect to FIGS. 2 and 3.

Machine translation system 202 first receives a plurality of test sentences 210. This is indicated by block 216 in FIG. 3. The sentences are then translated by MT system 202. The operation of machine translation system 202 is described in greater detail in the above-referenced paper. Briefly, in one embodiment, machine translation system 202 first parses test sentences 210 into a source language intermediate structure that represents the actions, agents and objects involved in the sentence, as well as relations between them. In one embodiment, this source language intermediate structure is a source language logical form. The process by which a logical form is generated is known and is set out in U.S. Pat. No. 5,966,686 entitled Method and System for Computing Semantic Logical Forms from Syntax Trees, issued Oct. 12, 1999.

Then, by applying knowledge learned by parallel corpora and word translation relationships, as well as translation dictionaries, the source language intermediate structure is translated into a corresponding target language intermediate structure. Again, in one embodiment, the target language intermediate structure is a target language logical form.

Finally, the target language intermediate structure is transformed into a target language string. The target language string is represented by the translation results 212 shown in FIG. 2.

From each of the translation phases in MT system 202, a set of features is extracted. In one embodiment, the set of features is a relatively large number of statistics that describe the translation process. The set of features extracted from MT system 202 for each test sentence 210 is indicated by block 214 in FIG. 2. Translating the test sentences and extracting the set of features is indicated by block 218 in FIG. 3.

The particular set of features 214 extracted from MT system 202 is described in greater detail below. Translation results 212, along with a human-generated translation of test sentences 210, are provided to evaluation component 204.

Evaluation component 204 assigns a trusted evaluation score to the translation results. The trusted score is indicative of the quality of the translation results associated with each test sentence 210. The trusted evaluation score is assigned by a trusted entity which, in one illustrative embodiment, is a human and may be a human linguist. The evaluation results for each sentence are represented by block 220 in FIG. 2, and the step of providing a trusted entity evaluation score of the translation results is illustrated at block 222 in FIG. 3.

The evaluation results 220 can be generated in a wide variety of ways. For example, in one embodiment, each of the translation results 212, corresponding to each test sentence 210, along with a reference translation produced by a human, are presented to between 4 and 7 independent human evaluators. The human evaluators assign a score of between 1 and 4 to indicate the accuracy and fluency of the translation (e.g., 1 being completely unacceptable and 4 being an ideal translation). The score from each evaluator can then be averaged and scaled to a range of 0-1. This represents the evaluation result for each sentence indicated by block 220 in FIG. 2.

The set of features 214, along with evaluation results 220, are provided to generator 206. Generator 206 can take any number of forms, and it computes a function or correlation between the set of extracted features 214 and the evaluation results 220. This function can be computed, for example, using a multivariate linear regression solver, using decision trees, or using support vector machines (SVMs).

By way of example, assume that FIG. 4 represents a matrix of extracted features 214 where the features are designated F1-FM and the sentences corresponding to each feature vector are designated sentence 1-sentence N. Also, assume that each sentence has a human evaluation score (or trusted entity evaluation score) listed in the matrix as well.

Where generator 206 is a multivariate linear regression solver, it first selects a feature from the feature matrix shown in FIG. 4, such as feature F1. Generator 206 then determines how feature F1, across all sentences, correlates to the trusted evaluation score for each of the sentences. Generator 206 performs this step for each feature F1-FM and chooses the one that has the best correlation to the trusted evaluation score. Generator 206 then calculates a correlation coefficient describing the correlation between the selected feature and the trusted evaluation score. The feature with the best correlation is placed on a selected feature list.

Generator 206 then attempts to add a second feature to its selected feature list. For instance, assume that during the first pass generator 206 found that F3 had the highest correlation to the evaluation score. Thus, generator 206 will have selected feature F3 as the first relevant feature to be used and placed it on the selected feature list. Now generator 206 tires to add a second feature. Generator 206 selects one of the remaining features for examination.

Assume for the sake of this example that generator 206 selects and examines feature F1 for addition to the selected feature list. To do this, generator 206 determines how closely the subset of features F3 and F1 correlate to the trusted evaluation score. Generator 206 performs this step for each of the remaining features (i.e., it determines how closely features F3 and F2 correlate to the trusted evaluation score, it does the same for features F3, F4 and F3, F5, up to F3, FM). Generator 206 finds the best combination of features (i.e., the best additional feature to add to the selected feature list) and adds that feature to the selected feature list. Generator 206 continues this process until the correlation between the features in the selected feature list and the trusted evaluation score does not change by adding an additional feature from the set of extracted features 214 to the selected feature list. The relevant set of features, along with the associated correlation coefficients and constants (also collectively referred to as the confidence metric parameters) are indicated by block 224 in FIG. 2, and the steps of processing the extracted features 214 and trusted evaluation scores 220 to obtain confidence metric parameters 224 is indicated by block 226 in FIG. 3.

Where generator 206 is comprised of some other technique, such as decision trees or SVMs, the standard training process for this embodiment is instead applied. The resultant subset of extracted features selected by this training process along with the results of the training process itself—such as the actual decision tree (if using decision trees) or kernel parameters (if using SVMs)—then comprise the confidence metric parameters 224.

Having found the subset of extracted features that are relevant to finding a confidence metric, and having also identified a correspondence between these features and the trusted entity-assigned score, the correspondence parameters 224 are plugged into MT system 202 such that it can now compute a confidence metric value for each translated sentence during runtime. In order to do this, recall that MT system 202 has already been instrumented to extract the set of features 214. MT system 202 simply extracts the relevant features 224 for each computed sentence and applies the confidence metric parameters 224 to compute the confidence score. Where generator 206 is a multivariate linear regression solver, each extracted relevant feature is multiplied by the coefficient derived by the multivariate regression solver, and the sum of those, together with the derived constant, produce the resulting confidence metric score for the sentence being translated. Where generator 206 trains decision trees, the decision tree is applied to the relevant features and the resulting probability is output as the confidence score. Where generator 206 uses SVMs or some alternate machine learning technique, the appropriate runtime usage of the confidence metric parameters 224 is applied.

In one embodiment, the confidence metric value ranges between 0 and 1, 0 meaning that the system has a very low confidence in the translation and 1 meaning that the system has a very high confidence in the translation. These confidence metric values can be displayed to a translator who can choose the translation result, modify it, or completely discard it based on the confidence metric, or it can be used by a translator's workbench to determine which translation results 212 are actually shown to the human translator. Of course, the confidence metrics can be used in any other manner, as desired.

The extraction of the set of features 214, and the particular features extracted, will now be discussed in greater detail with respect to FIGS. 5 and 6. It should be noted that attached as appendix A is a full set of approximately 200 extracted features which are extracted from MT system 202 in accordance with one embodiment of the present invention. This is but one exemplary list of extracted features, which are extracted from MT system 202, and more, different, or fewer features can be extracted as well.

Figure 5:
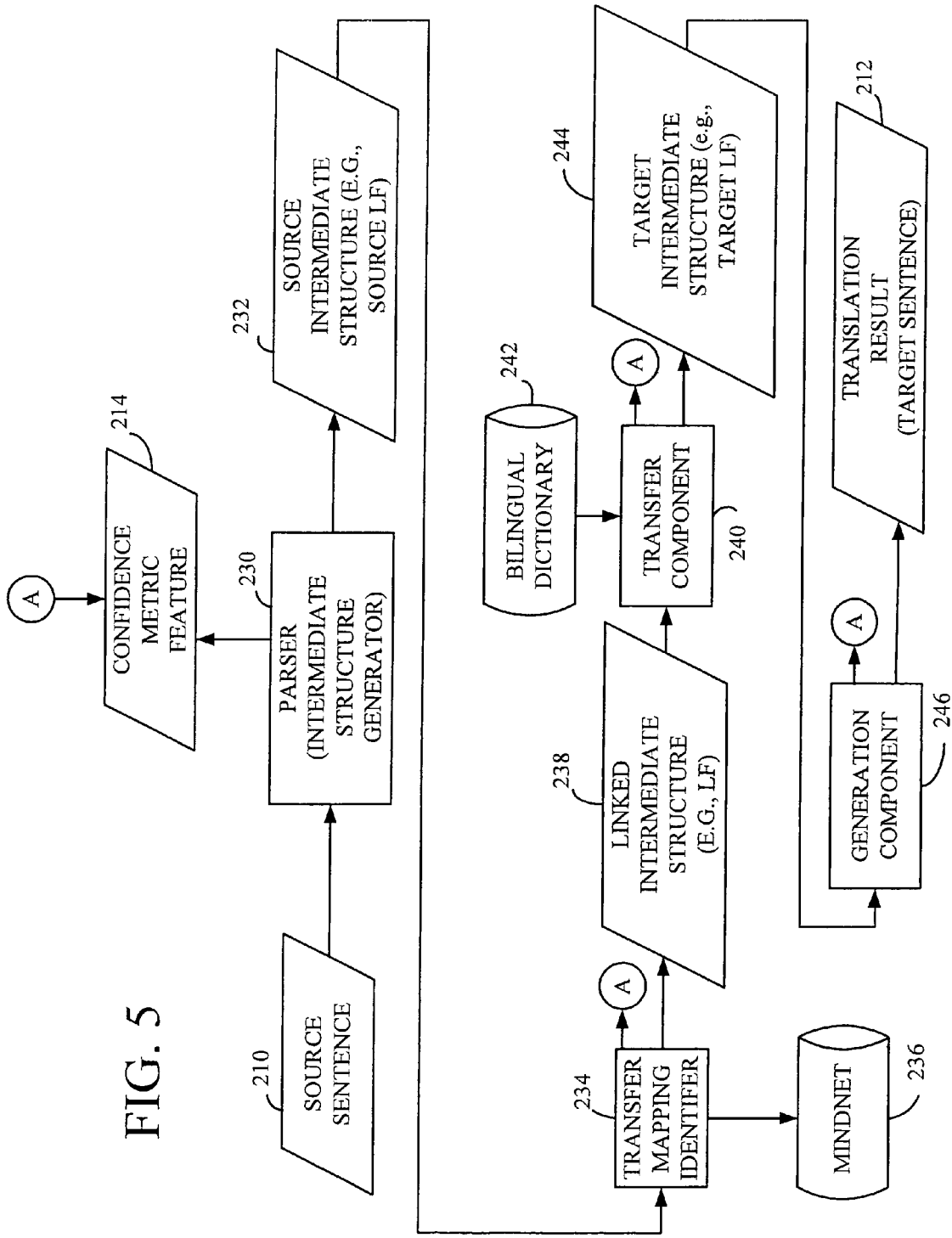
FIG. 5 is a block diagram of a machine translation system in accordance with one embodiment of the present invention.

FIG. 5 is a more detailed block diagram of one embodiment of MT system 202 instrumented to produce the extracted set of confidence metric features 214 during translation of source sentence 210 into a translation result (or target sentence) 212. The source sentence 210 is first provided to a parser 230 that parses source sentence 210 into the intermediate structure (such as a source language logical form). The source intermediate structure is indicated by block 232 in FIG. 5.

The parser 230 may also identify subcategories of nodes in the source intermediate structure. The count of nodes in a particular subcategory may be emitted as a feature, and this subcategorization may be used by the transfer component 240. The relationships between the nodes in the source intermediate structure 232 may also be tracked in a corresponding way.

In one embodiment, the node categories include the following: Pronouns (such as "he", "she" or "it"), Coindexed Node Copies (such as relative pronouns like "who" in "The man who is leaving lost his glove"), domain specific multi-word units called Factoids (in the computer domain, these include phrases such as "Microsoft SQL Server"), Coordinations (such as "and", "or", and "but"), and the remainder, which are simply called Other Lemmas. In this same embodiment the relations are subdivided into Prepositions (such as "with" and "under") and Other Relationships.

During the parsing process, a number of confidence metric features 214 are extracted. For example, it can be important to know whether parser 230 was successful in generating a spanning parse—that is, a parse that spans the entire source sentence 210—or whether the parser produced a non-spanning (or fitted) parse by conjoining parse trees for the subsequences of the sentence that it was able to parse. Therefore, parser 230 outputs a value that simply indicates whether a spanning parse was found. It is believed that if the parse is fitted, the translation result will seldom be of good quality. Parser 230 also outputs, as a confidence metric feature 214, a value indicative of the size of the source sentence. It is believed that very short sentences are often difficult to translate successfully since the available context to disambiguate word sentences and meanings is quite small. On the other hand, very long sentences are often quite difficult to parse correctly due to the inherent ambiguities of natural language. Thus, the size of the source sentence (given, for example, simply as the number of words in the source sentence) is output by parser 230 as well.

During translation, source intermediate structures 232 are provided to transfer mapping identifier 234. Transfer mapping identifier 234 has access to a lexical knowledge base 236, one embodiment of which is referred to as the Mindnet knowledge base or database. The structure of Mindnet database 236 is described in greater detail in Richardson et al., *MINDNET: Acquiring and Structuring Semantic Information From Text*, Proceedings of COLING-ACL 98 (1998). Briefly, the Mindnet database 236 is a repository holding transfer mappings from logical form alignment. Source and target language logical forms are aligned and transfer mappings indicative of that alignment are placed in the Mindnet database 236. However, any database that contains a mapping between source and language intermediate linguistic structures can be used as well.

In any case, transfer mapping identifier 234 receives the source intermediate structure 232 and identifies transfer mappings in database 236 that correspond to the source intermediate structure. In doing this, the source intermediate structure 232 is matched by transfer mapping identifier 234 to source intermediate structures in transfer mapping database 236. Multiple transfer mappings in the database 236 may match portions of the source intermediate structure 232. Transfer mapping identifier 234 can attempt to find the best match in database 236 based on a variety of factors described in the above-referenced paper.

After a set of matching transfer mappings is found, identifier 234 creates links on nodes of the source intermediate structure 232 to copies of corresponding target intermediate structure segments retrieved from the mappings in database 236. Identifier 234 thus outputs a linked intermediate structure indicated by 238 in FIG. 5. Linked intermediate structure 238 is provided to transfer component 240.

Transfer component 240 can illustratively have access to a bilingual dictionary 242 and any other word association databases that are used during translation. Transfer component 240 receives the linked intermediate structure 238 and creates a target intermediate structure by stitching together the linked intermediate structure fragments to obtain the target intermediate structure. This can be accomplished as described in greater detail in the above-referenced Richardson paper. Briefly, it can be accomplished through a top down traversal of the linked intermediate structure 238 in which the target intermediate structure segments pointed to by the links in structure 238 are simply stitched together. In cases where no applicable transfer mapping is found, the nodes of the source intermediate structure and their translation are simply copied into the target intermediate structure. Also, single word translations may still be found from bilingual dictionary 242. Transfer component 240 thus outputs target intermediate structure (e.g., target logical form) 244.

A large number of extracted features are extracted during the process of translating source intermediate structure 232 into target intermediate structure 244. The multi-word mappings in database 236 are referred to as rules. Several features are extracted that relate to the application of those rules. For example, some features include the number of rules used in translating the source intermediate structure 232 into the target intermediate structure 234, the average and maximum size of rules used (larger rules tend to carry more context and/or are more likely to capture idioms and domain expressions, hence leading to better translations), the total frequency of all rules used in the translation, the average and weighted average of the rule frequency, and the average and maximum rule alignment score. To explain the last feature a bit more, each of the rules in database 236 may illustratively have a confidence score associated with it. A confidence score illustrates the confidence with which the rule was generated (i.e., how well the rule was trained). Thus, when the rule is applied, that confidence score is extracted (or more particularly the average and maximum rule alignment score is extracted) as an extracted feature.

In addition, confidence metric features are extracted which indicate whether the words in source sentence 210 were translated using database 236, a domain translation dictionary (such as bilingual dictionary 242), using word association files learned from parallel corpora, or whether the words were left untranslated. This is described in greater detail with respect to FIG. 6.

FIG. 6 is a matrix illustrating the source of the translation of words in the source sentence plotted against the types of words translated. For example, each of the words in the source sentence can be assigned to a word type, such as pronouns, prepositions, coordinations, factoids, coindexed node copies, etc. A number of those types of words are illustrated in FIG. 6 for the sake of example only.

Also, as discussed above, each word can be translated using a different source, such as the Mindnet database 236, bilingual dictionaries, word association files, etc., or the words can be left untranslated. A number of sources of translation are shown in FIG. 6 for the sake of example only.

The number of occurrences of each type of word (pronoun, proposition, coordination, factoid, etc.) translated using each translation source (Mindnet, bilingual dictionary, word association file, etc.) can be plotted in the matrix.

Each of these numbers in the matrix can be an extracted confidence metric feature 214, expressed both as an absolute count and as a percentage of the total. However, the totals can be extracted features as well, such as the total number of words in the sentence translated using each of the alternate sources of translation and the total numbers of the different types of words in the source sentence. The marginal totals can be expressed both as absolute counts and as percentages.

After the target intermediate structure 244 is generated as shown in FIG. 5, it is provided to generation component 246. Generation component 246 reads the target intermediate structure 244 and generates the target sentence (or translation result) 212. Confidence metric features 214 can be extracted by generation component 246 as well. For example, one confidence metric feature that is extracted is the perplexity of the target sentence 212. The perplexity of target sentence 212 is indicative of a measure of the fluency of the generated text using a statistical language model.

Figure 7:
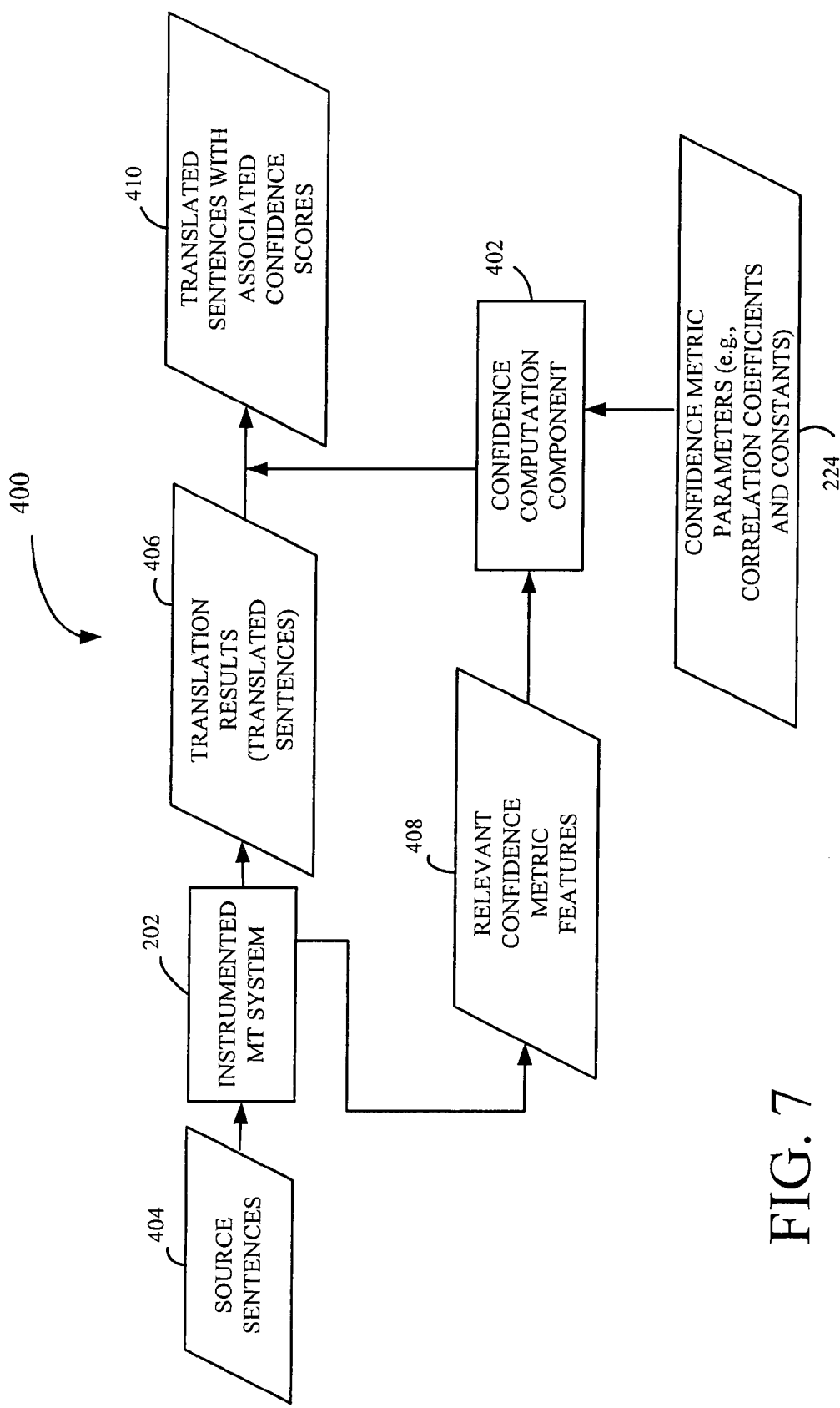
FIG. 7 is a block diagram of a runtime machine translation system in accordance with one embodiment of the present invention.

Having now identified relevant features and the correlation between those relevant features and the trusted entity-assigned quality scores, a runtime system 400 will now be discussed with respect to FIG. 7. Runtime system 400 includes the instrumented MT system 202 and a confidence computation component 402.

Source sentences 404 are received by MT system 202. MT system 202 generates the translation results (translated sentences) 406. System 202 also generates the confidence metric features that were identified by generator 206 as being relevant confidence metric features. This is indicated by block 408 in FIG. 7. Of course, it should be realized that instrumented MT system 202 can extract all of the features extracted during the training process, or only the relevant subset of features.

In any case, the confidence metric features 408 are provided to confidence computation component 402. Confidence computation component 402 also has access to the confidence metric parameters (a list of the relevant subset of extracted features and the corresponding correlation coefficients and constants associated with the relevant subset of extracted features) 224. Confidence computation component 402 applies the confidence metric parameters 204 against the relevant confidence metric features extracted by MT system 202 to generate the confidence score associated with the source sentence 404 being translated. This confidence score is added to the translation results 406 and the resultant output of the system includes the translated sentences along with the associated confidence scores as indicated by block 410 in FIG. 7.

It should be noted that while the present discussion proceeds with respect to a number of extracted features and relevant features, different or other features can be used as well. It may be desirable to have a set of features that covers many aspects of the machine translation system, even if many are slight variations on one another. It can be difficult to determine which variations will have the best predictive power or correlation, especially when considering combinations of the different features. However, it is certainly not necessary to have the exact feature set described herein, as even slight variants may have comparable performance. It will also be noted that different subsets of extracted features may be relevant to the correlation, based on the particular domain being translated, the source and target languages, etc. Therefore, the present system need not be locked into any subset of relevant features.

It should also be noted that the techniques used in the present invention can vary widely as well. For example, although one technique was described for finding the relevant subset of extracted features, other techniques could be used as well. Instead of using a greedy algorithm to find the relevant subset of extracted features, all different combinations of extracted features could be tested although this may undesirably increase machine learning time. Similarly, as mentioned above, completely different techniques can be used, such as decision trees or support vector machines.

In any case, it can be seen that the present invention provides a machine translation system that outputs not only a translation result, but a translation result along with a confidence metric where the confidence metric is indicative of a quality score that would be assigned by a trusted entity, such as a human. This is the case because the features used in generating the confidence metric are correlated to trusted entity-assigned quality scores during training.

Although the present invention has been described with reference to particular embodiments, workers skilled in the art will recognize that changes may be made in form and detail without departing from the spirit and scope of the invention.

Appendix A: Example List of Confidence Metric Features.
Input size (number of source nodes) mappings
Average mapping size
Maximum match size
Average align score
Maximum align score target nodes
Average link size target nodes divided by number of source nodes
Fitted parse (1 or 0)
Was there a root coordination (1 or 0)
Was there coordination anywhere (1 or 0)
Was there more than one parse (1 or 0)
Total frequency in the training corpus of the mappings
Average frequency of the mappings
Weighted average (by size of match) of the mapping frequency
Pronouns Total
Pronouns translated from Mindnet
Pronouns translated from Dictionary
Pronouns translated from Rules
Pronouns Lang-neutral
Pronouns Untranslated
Pronouns translated from Word-assoc
Percent Pronouns translated from Mindnet
Percent Pronouns translated from Dictionary
Percent Pronouns translated from Rules
Percent Pronouns Lang-neutral
Percent Pronouns Untranslated
Percent Pronouns translated from Word-assoc
Pronouns Total divided by input size
Pronouns translated from Mindnet divided by input size
Pronouns translated from Dictionary divided by input size
Pronouns translated from Rules divided by input size
Pronouns Lang-neutral divided by input size
Pronouns Untranslated divided by input size
Pronouns translated from Word-assoc divided by input size
Coindexed node copies Total
Coindexed node copies translated from Mindnet
Coindexed node copies translated from Dictionary
Coindexed node copies translated from Rules
Coindexed node copies Lang-neutral
Coindexed node copies Untranslated
Coindexed node copies translated from Word-assoc
Percent Coindexed node copies translated from Mindnet
Percent Coindexed node copies translated from Dictionary
Percent Coindexed node copies translated from Rules
Percent Coindexed node copies Lang-neutral
Percent Coindexed node copies Untranslated
Percent Coindexed node copies translated from Word-assoc
Coindexed node copies Total divided by input size
Coindexed node copies translated from Mindnet divided by input size
Coindexed node copies translated from Dictionary divided by input size
Coindexed node copies translated from Rules divided by input size
Coindexed node copies Lang-neutral divided by input size
Coindexed node copies Untranslated divided by input size
Coindexed node copies translated from Word-assoc divided by input size
Factoids as a unit Total
Factoids as a unit translated from Mindnet
Factoids as a unit translated from Dictionary
Factoids as a unit translated from Rules
Factoids as a unit Lang-neutral
Factoids as a unit Untranslated
Factoids as a unit translated from Word-assoc
Percent Factoids as a unit translated from Mindnet
Percent Factoids as a unit translated from Dictionary
Percent Factoids as a unit translated from Rules
Percent Factoids as a unit Lang-neutral
Percent Factoids as a unit Untranslated
Percent Factoids as a unit translated from Word-assoc
Factoids as a unit Total divided by input size
Factoids as a unit translated from Mindnet divided by input size
Factoids as a unit translated from Dictionary divided by input size
Factoids as a unit translated from Rules divided by input size
Factoids as a unit Lang-neutral divided by input size
Factoids as a unit Untranslated divided by input size
Factoids as a unit translated from Word-assoc divided by input size
Factoids via Facts and factgen rules Total
Factoids via Facts and factgen rules translated from Mindnet
Factoids via Facts and factgen rules translated from Dictionary
Factoids via Facts and factgen rules translated from Rules
Factoids via Facts and factgen rules Lang-neutral
Factoids via Facts and factgen rules Untranslated
Factoids via Facts and factgen rules translated from Word-assoc
Percent Factoids via Facts and factgen rules translated from Mindnet
Percent Factoids via Facts and factgen rules translated from Dictionary
Percent Factoids via Facts and factgen rules translated from Rules
Percent Factoids via Facts and factgen rules Lang-neutral
Percent Factoids via Facts and factgen rules Untranslated
Percent Factoids via Facts and factgen rules translated from Word-assoc
Factoids via Facts and factgen rules Total divided by input size
Factoids via Facts and factgen rules translated from Mindnet divided by input size
Factoids via Facts and factgen rules translated from Dictionary divided by input size
Factoids via Facts and factgen rules translated from Rules divided by input size
Factoids via Facts and factgen rules Lang-neutral divided by input size
Factoids via Facts and factgen rules Untranslated divided by input size
Factoids via Facts and factgen rules from Word-assoc divided by input size
Other Lemmas Total Other Lemmas translated from Mindnet
Other Lemmas translated from Dictionary
Other Lemmas translated from Rules
Other Lemmas Lang-neutral
Other Lemmas Untranslated
Other Lemmas translated from Word-assoc percentage of Other Lemmas translated from Mindnet
Percent Other Lemmas translated from Dictionary
Percent Other Lemmas translated from Rules
Percent Other Lemmas Lang-neutral
Percent Other Lemmas Untranslated
Percent Other Lemmas translated from Word-assoc
Other Lemmas Total divided by input size
Other Lemmas translated from Mindnet divided by input size
Other Lemmas translated from Dictionary divided by input size
Other Lemmas translated from Rules divided by input size
Other Lemmas Lang-neutral divided by input size
Other Lemmas Untranslated divided by input size
Other Lemmas translated from Word-assoc divided by input size
Prepositions Total
Prepositions translated from Mindnet
Prepositions translated from Dictionary
Prepositions translated from Rules
Prepositions Lang-neutral
Prepositions Untranslated
Prepositions translated from Word-assoc
Percent Prepositions translated from Mindnet
Percent Prepositions translated from Dictionary
Percent Prepositions translated from Rules
Percent Prepositions Lang-neutral
Percent Prepositions Untranslated
Percent Prepositions translated from Word-assoc
Prepositions Total divided by input size
Prepositions translated from Mindnet divided by input size
Prepositions translated from Dictionary divided by input size
Prepositions translated from Rules divided by input size
Prepositions Lang-neutral divided by input size
Prepositions Untranslated divided by input size
Prepositions translated from Word-assoc divided by input size
Other relationships Total
Other relationships translated from Mindnet
Other relationships translated from Dictionary
Other relationships translated from Rules
Other relationships Lang-neutral
Other relationships Untranslated
Other relationships translated from Word-assoc
Percent Other relationships translated from Mindnet
Percent Other relationships translated from Dictionary
Percent Other relationships translated from Rules
Percent Other relationships Lang-neutral
Percent Other relationships Untranslated
Percent Other relationships translated from Word-assoc
Other relationships Total divided by input size
Other relationships translated from Mindnet divided by input size
Other relationships translated from Dictionary divided by input size
Other relationships translated from Rules divided by input size
Other relationships Lang-neutral divided by input size
Other relationships Untranslated divided by input size
Other relationships translated from Word-assoc divided by input size
Coord lemmas Total
Coord lemmas translated from Mindnet
Coord lemmas translated from Dictionary
Coord lemmas translated from Rules
Coord lemmas Lang-neutral
Coord lemmas Untranslated
Coord lemmas translated from Word-assoc
Percent Coord lemmas translated from Mindnet
Percent Coord lemmas translated from Dictionary
Percent Coord lemmas translated from Rules
Percent Coord lemmas Lang-neutral
Percent Coord lemmas Untranslated
Percent Coord lemmas translated from Word-assoc
Coord lemmas Total divided by input size
Coord lemmas translated from Mindnet divided by input size
Coord lemmas translated from Dictionary divided by input size
Coord lemmas translated from Rules divided by input size
Coord lemmas Lang-neutral divided by input size
Coord lemmas Untranslated divided by input size
Coord lemmas translated from Word-assoc divided by input size
Total number of words translated from Mindnet
Total number of words translated from Dictionary
Total number of words translated from Rules
Total number of words Lang-neutral
Total number of words Untranslated
Total number of words translated from Word-assoc
Total number of words translated from Mindnet divided by input size
Total number of words translated from Dictionary divided by input size
Total number of words translated from Rules divided by input size
Total number of words Lang-neutral divided by input size
Total number of words Untranslated divided by input size
Total number of words translated from Word-assoc divided by input size The Following Set are Computed After Factoids are Added to Other Lemmas and Language Neutral Numbers are Ignored Pronouns Total
Pronouns translated from Mindnet
Pronouns translated from Dictionary
Pronouns translated from Rules
Pronouns Lang-neutral
Pronouns Untranslated
Pronouns translated from Word-assoc
Percent Pronouns translated from Mindnet
Percent Pronouns translated from Dictionary
Percent Pronouns translated from Rules
Percent Pronouns Lang-neutral
Percent Pronouns Untranslated
Percent Pronouns translated from Word-assoc
Pronouns Total divided by input size
Pronouns translated from Mindnet divided by input size
Pronouns translated from Dictionary divided by input size
Pronouns translated from Rules divided by input size
Pronouns Lang-neutral divided by input size
Pronouns Untranslated divided by input size
Pronouns translated from Word-assoc divided by input size
Other Lemmas Total
Other Lemmas translated from Mindnet
Other Lemmas translated from Dictionary
Other Lemmas translated from Rules
Other Lemmas Lang-neutral Other Lemmas Untranslated
Other Lemmas translated from Word-assoc
Percent Other Lemmas translated from Mindnet
Percent Other Lemmas translated from Dictionary
Percent Other Lemmas translated from Rules
Percent Other Lemmas Lang-neutral
Percent Other Lemmas Untranslated
Percent Other Lemmas translated from Word-assoc
Other Lemmas Total divided by input size
Other Lemmas translated from Mindnet divided by input size
Other Lemmas translated from Dictionary divided by input size
Other Lemmas translated from Rules divided by input size
Other Lemmas Lang-neutral divided by input size
Other Lemmas Untranslated divided by input size
Other Lemmas translated from Word-assoc divided by input size Appendix B: The Feature Set Selected by One Run of the Multivariate Linear Regression Solver.
Average mapping size
Fitted parse
Input size
Maximum align score
Maximum match size
Number of Factoids via Facts and factgen rules Total
Number of Pronouns translated from Mindnet
Number of Pronouns Total divided by input size
Output logical form size
Other Lemmas Untranslated

What is claimed is:

1. A method of training a machine translation computing device to generate confidence scores indicative of a quality of a translation result, comprising:
   translating a source string with a machine translation computing device to generate a target string;
   extracting features from the machine translator, indicative of performance of translation steps in the machine translator;
   obtaining a trusted entity-assigned translation score indicative of a trusted entity-assigned translation quality of the target string;
   identifying a relationship between a subset of the extracted features and the trusted entity-assigned translation score;
   parsing the source string into a source intermediate linguistic structure indicative of a meaning of the source string;
   wherein translating includes translating the source intermediate linguistic structure to a target intermediate linguistic structure;
   wherein translating the source intermediate linguistic structure comprises identifying mappings, in a mapping database, that map portions of the source intermediate linguistic structure to portions of the target intermediate linguistic structure; and
   wherein extracting one or more features indicative of a quality of translating the source intermediate linguistic structure comprises extracting a feature indicative of a number of identified mappings.

2. The method of claim 1 wherein extracting features comprises:
   extracting a feature indicative of a size of the source string.

3. The method of claim 1 wherein extracting one or more features indicative of a quality of translating the source intermediate linguistic structure comprises:
   extracting a feature indicative of a size of identified mappings.

4. The method of claim 1 wherein extracting one or more features indicative of a quality of translating the source intermediate linguistic structure comprises:
   extracting a feature indicative of a frequency with which mappings where identified.

5. The method of claim 1 wherein each mapping has an associated confidence score and wherein extracting one or more features indicative of a quality of translating the source intermediate linguistic structure comprises:
   extracting a feature indicative of the confidence scores associated with the identified mappings.

6. The method of claim 1 wherein translating the source intermediate linguistic structure comprises:
   translating portions of the source intermediate linguistic structure using another translation device other than the mapping database.

7. The method of claim 1 wherein extracting features comprises:
   extracting a feature indicative of the translation device used.

8. The method of claim 7 wherein extracting features comprises:
   extracting a feature indicative of an amount of the source string translated with another translation device.

9. The method of claim 7 wherein extracting features comprises:
   extracting a feature indicative of a type of words translated with another translation device.

10. The method of claim 1 wherein extracting features comprises:
    calculating a perplexity of the target string with a statistical language model.

11. A method of training a machine translation computing device to generate confidence scores indicative of a quality of a translation result, comprising:
    translating a source string with a machine translation computing device to generate a target string;
    extracting features from the machine translator, the features being indicative of performance of translation steps in the machine translator;
    obtaining a trusted entity-assigned translation score indicative of a trusted entity-assigned translation quality of the target string;
    identifying a relationship between a subset of the extracted features and the trusted entity- assigned translation score; and
    wherein translating includes parsing the source string into a source intermediate linguistic structure indicative of a meaning of the source string;
    wherein extracting features comprises extracting one or more features indicative of a quality of parsing;
    wherein translating includes translating the source intermediate linguistic structure into a target intermediate linguistic structure;
    wherein extracting features comprises extracting one or more features indicative of a quality of translating the source intermediate linguistic structure into the target intermediate linguistic structure;
    wherein translating the source intermediate linguistic structure comprises identifying mappings, in a mapping database, that map portions of the source intermediate linguistic structure to portions of the target intermediate linguistic structure;
    wherein translating the source intermediate linguistic structure further comprises translating portions of the source intermediate linguistic structure using another translation device other than the mapping database; and wherein some words in the source intermediate linguistic structure remain untranslated, and wherein extracting one or more features indicative of a quality of translating the source intermediate linguistic structure comprises extracting a feature indicative of untranslated words in the source intermediate linguistic structure.

12. A method of training a machine translation computing device to generate confidence scores indicative of a quality of a translation result, comprising:

translating a source string with a machine translation computing device to generate a target string;

extracting features from the machine translator, indicative of performance of translation steps in the machine translator;

obtaining a trusted entity-assigned translation score indicative of a trusted entity-assigned translation quality of the target string;

identifying a relationship between a subset of the extracted features and the trusted entity- assigned translation score;

wherein translating includes parsing the source string into a source intermediate linguistic structure indicative of a meaning of the source string;

wherein translating includes translating the source intermediate linguistic structure to a target intermediate linguistic structure;

wherein extracting features comprises extracting features indicative of a quality of translating the source intermediate linguistic structure into the target intermediate linguistic structure; and wherein some words in the source intermediate linguistic structure remain untranslated, and wherein extracting one or more features indicative of a quality of translating the source intermediate linguistic structure comprises extracting a feature indicative of untranslated words in the source intermediate linguistic structure.

* * * * *